United States Patent
Pryputniewicz

(10) Patent No.: US 8,459,663 B2
(45) Date of Patent: Jun. 11, 2013

(54) SNOWMOBILE SKI EDGE

(76) Inventor: Nicholas D. Pryputniewicz, Waterville, NY (US)

( * ) Notice: Subject to any disclaimer, the term of this patent is extended or adjusted under 35 U.S.C. 154(b) by 331 days.

(21) Appl. No.: 12/900,423

(22) Filed: Oct. 7, 2010

(65) Prior Publication Data

US 2011/0079970 A1    Apr. 7, 2011

Related U.S. Application Data

(60) Provisional application No. 61/272,582, filed on Oct. 7, 2009.

(51) Int. Cl.
*A63C 5/00* (2006.01)

(52) U.S. Cl.
USPC ............................................................. 280/28

(58) Field of Classification Search
USPC .................................................. 280/28, 608
See application file for complete search history.

(56) References Cited

U.S. PATENT DOCUMENTS

| | | | |
|---|---|---|---|
| 3,605,926 A | 9/1971 | Leonawicz | |
| 3,711,109 A * | 1/1973 | Hofbauer | 280/28 |
| 3,732,939 A | 5/1973 | Samson | |
| 3,866,933 A * | 2/1975 | Mollring | 280/28 |
| 3,942,812 A | 3/1976 | Kozlow | |
| 5,344,168 A * | 9/1994 | Olson et al. | 280/28 |
| 5,599,030 A | 2/1997 | Campbell et al. | |
| 6,105,979 A * | 8/2000 | Desrochers | 280/28 |
| 6,331,008 B2 * | 12/2001 | Cormican | 280/22 |
| 6,513,612 B2 * | 2/2003 | Moriyama et al. | 180/182 |
| 7,287,763 B1 * | 10/2007 | Beaudoin | 280/28 |
| 7,427,074 B2 | 9/2008 | Lemieux et al. | |
| 7,487,974 B2 * | 2/2009 | Dick et al. | 280/28 |
| 7,500,679 B2 * | 3/2009 | Wade | 280/28 |
| 7,614,627 B2 * | 11/2009 | Musselman | 280/28 |
| 7,857,326 B2 * | 12/2010 | Musselman | 280/28 |
| 2001/0022435 A1 * | 9/2001 | Cormican | 280/28 |
| 2002/0105166 A1 * | 8/2002 | Lemieux | 280/609 |
| 2003/0034619 A1 * | 2/2003 | Bergstrom | 280/28 |
| 2004/0061296 A1 | 4/2004 | Metheny | |
| 2004/0160026 A1 * | 8/2004 | Lund | 280/28 |
| 2005/0017465 A1 * | 1/2005 | Bergstrom | 280/28 |
| 2006/0061051 A1 * | 3/2006 | Lemieux | 280/28 |
| 2006/0061052 A1 * | 3/2006 | Lemieux | 280/28 |
| 2006/0076742 A1 * | 4/2006 | Scholl | 280/28 |
| 2009/0289428 A1 * | 11/2009 | Musselman | 280/28 |
| 2010/0127467 A1 * | 5/2010 | Phillips | 280/28 |
| 2010/0140007 A1 * | 6/2010 | Ogura et al. | 180/182 |

FOREIGN PATENT DOCUMENTS

| CA | 955292 A | 9/1974 |
|---|---|---|
| CA | 2217279 A1 | 4/1999 |

* cited by examiner

*Primary Examiner* — Katy M Ebner
(74) *Attorney, Agent, or Firm* — Richard C. Litman

(57) ABSTRACT

The snowmobile ski edge includes a main body having a plurality of mounting holes formed on a mounting face of the main body and a plurality of raised, breaker rails formed on the opposite face of the main body. The breaker rails are spaced across the width of the main body and break up ice and snow in front of the snowmobile skis to easily form new paths, which substantially reduces darting. Each breaker rail is angled to form a leading breaking face and a trailing face extending towards the back of the main body. Carbide inserts are disposed in grooves on both the breaking and trailing faces to strengthen and increase wear characteristics of the breaker rails. The main body includes sloping sides, which together with the breaker rails form channels to funnel broken ice and snow towards the back and reduce drag.

18 Claims, 6 Drawing Sheets

SNOWMOBILE SKI EDGE

CROSS-REFERENCE TO RELATED APPLICATION

This application claims the benefit of U.S. Provisional Patent Application Ser. No. 61/272,582, filed Oct. 7, 2009.

FIELD OF THE INVENTION

The present invention relates to snowmobile accessories, and more specifically to a snowmobile ski edge for minimizing darting

DESCRIPTION OF THE RELATED ART

Snowmobiles are utilitarian and recreational vehicles well suited for snowy terrain. A typical snowmobile comprises an aerodynamic body with at least one rear-drive traction belt in the back and a pair of skis in the front attached to handle bars. Due to the slippery terrain, traction and steering are very important aspects of the vehicle to maintain. One of the most frequent problems a snowmobile may face is a phenomenon called "darting", where the skis of the snowmobile have a tendency to travel in the rut or track formed by previous snowmobiles on the same trail. When a snowmobile darts, it is a temporary loss of steering resulting from violent jerking of the handlebars, which can lead to potential accidents and physical harm.

Some solutions have been proposed to address this problem. One solution is a curvilinear leading strip extending from the front of snowmobile ski runners. The strip helps to carve a path in the snow and thus provide limited darting prevention. However, any damage or wear on the curved strip requires full replacement of the runner, which ultimately adds costs. Another solution involves a similar shaped curved strip sandwiched between the ski and the runners. Similar to the above solution, this one provides the same benefits, yet neither solution break up potential barriers such that a new path may easily be made. Due to the above, it would be a benefit in the art to provide an anti-darting device capable of forming new paths with relative ease as well as being economical.

Thus, a snowmobile ski edge solving the aforementioned problems is desired.

SUMMARY OF THE INVENTION

The snowmobile ski edge includes a main body having a plurality of mounting holes formed on a mounting face of the main body and a plurality of raised, breaker rails formed on the opposite face of the main body. The breaker rails are spaced across the width of the main body and break up ice and snow in front of the snowmobile skis to easily form new paths, which substantially reduces darting. Each breaker rail is angled to form a leading breaking face and a trailing face extending towards the back of the main body. Carbide sections are disposed in grooves on both the breaking and trailing faces to strengthen and increase wear characteristics of the breaker rails. The main body includes sloping sides, which together with the breaker rails form channels to funnel broken ice and snow towards the back and reduce drag.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
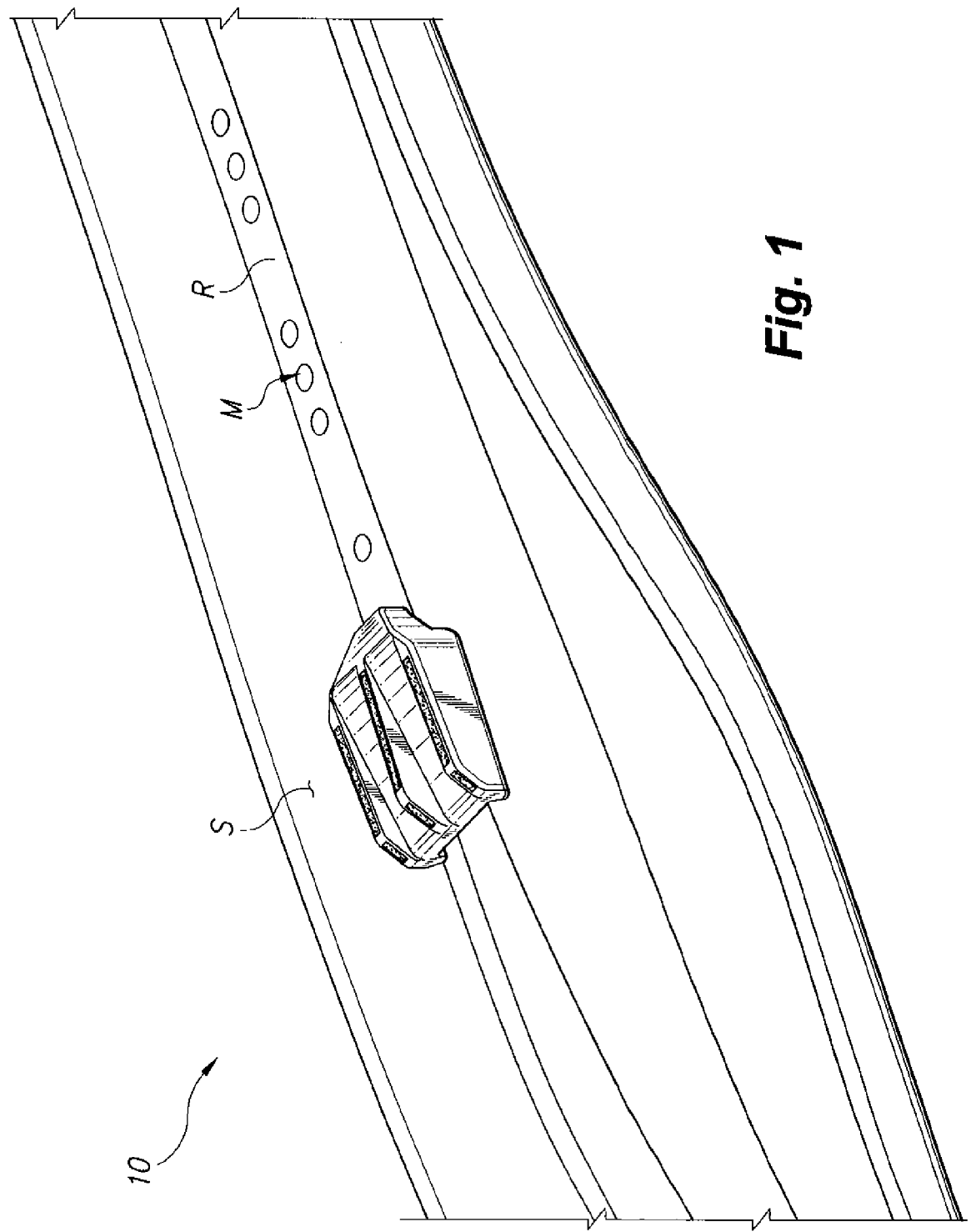
FIG. 1 is an environmental, perspective view of a snowmobile ski edge according to the present invention.

The present invention relates to a snowmobile ski edge, generally referred to in the drawings by reference number 10, that is configured to break up snow and ice or similar terrestrial obstructions in front of a snowmobile ski so that new paths, tracks or ruts may be made with ease, thereby substantially reduce darting. The most effective arrangement for the snowmobile ski edge 10 requires the snowmobile ski edge 10 to be mounted at the front of the ski S before the runners that are typically mounted in the keel of the ski S. In this manner, the snowmobile ski edge 10 breaks up the snow and ice before the runners such that the runners may more easily carve the desired path for the user. The snow and ice breaking features of the snowmobile ski edge 10, which will be further explained below, reduces darting effects by breaking the side walls in the previously formed ruts or tracks that are in the way of the desired direction of travel, and as a result, minimizes the tendency of the skis S to follow the previously formed track.

Figure 2:
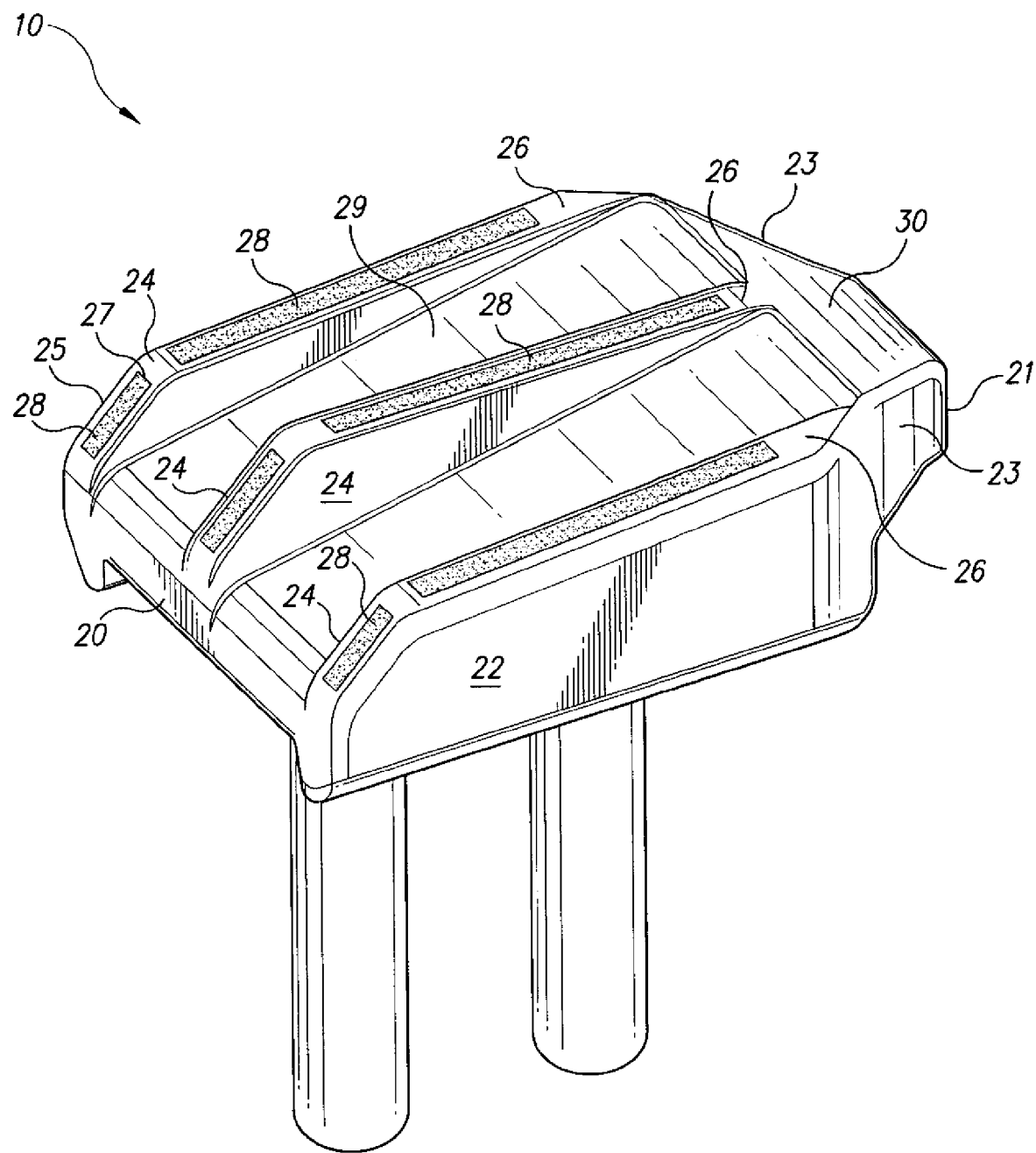
FIG. 2 is a bottom perspective view of the snowmobile ski edge according to the present invention.
Figure 3:
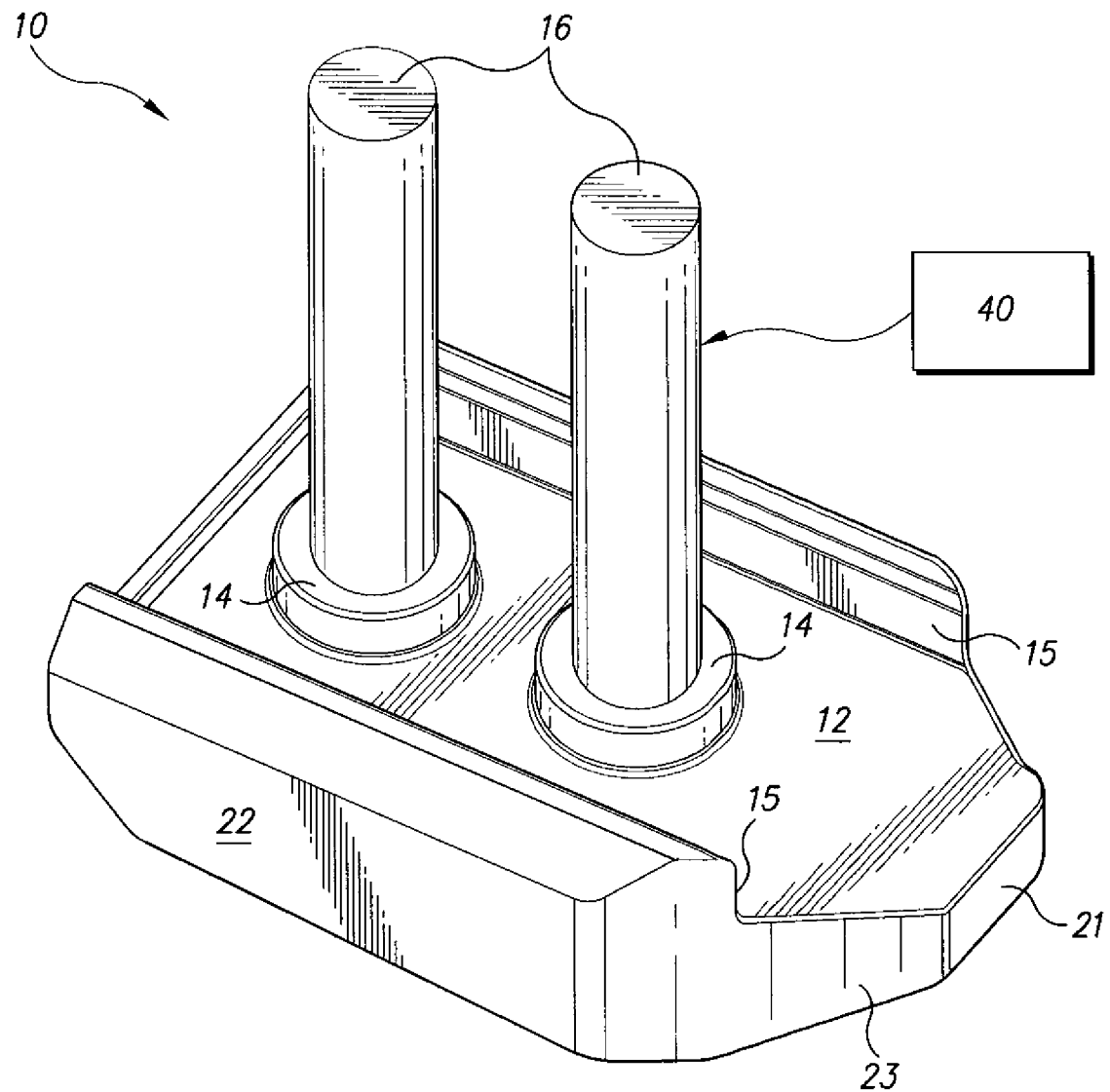
FIG. 3 is a top perspective view of the snowmobile ski edge according to the present invention.
Figure 4:
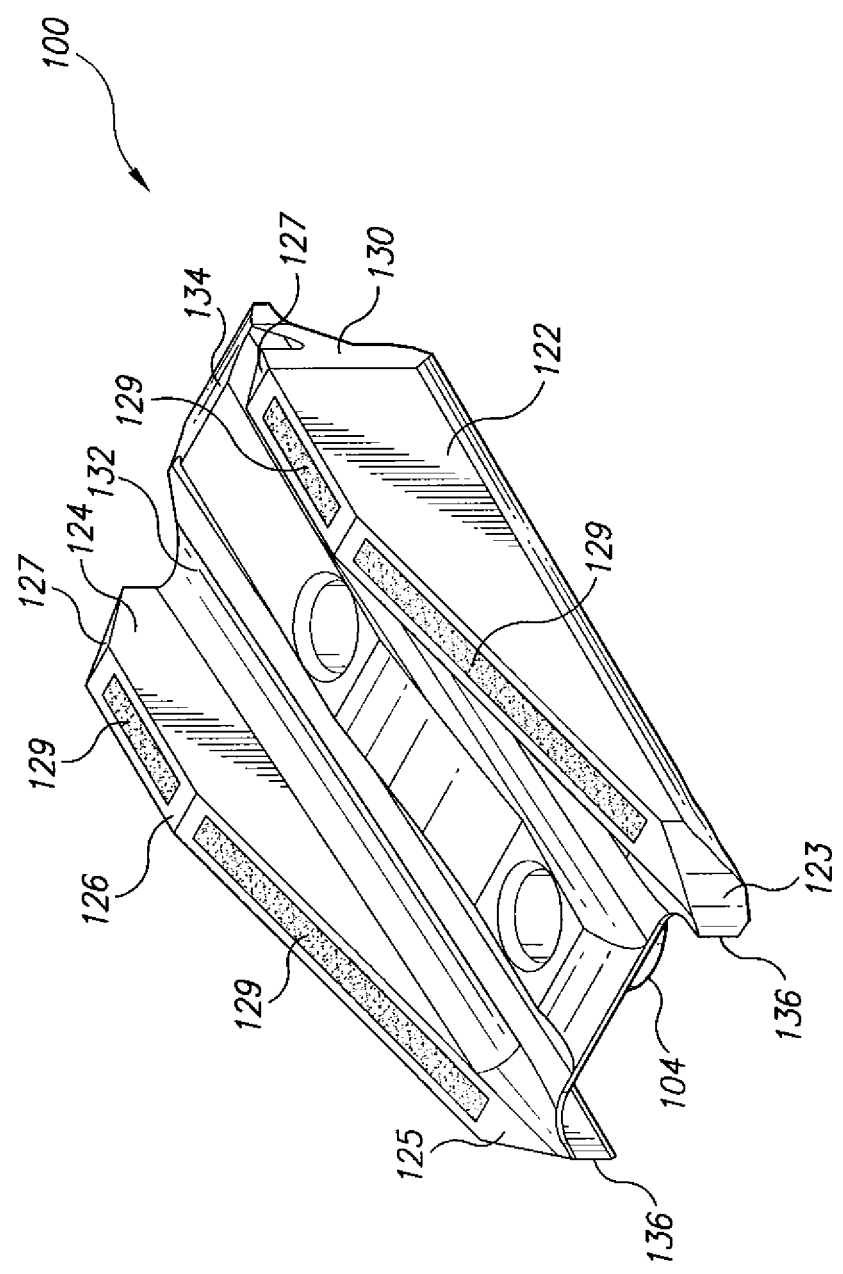
FIG. 4 is a perspective view of an alternative embodiment of a snowmobile ski edge according to the present invention.
Figure 5:
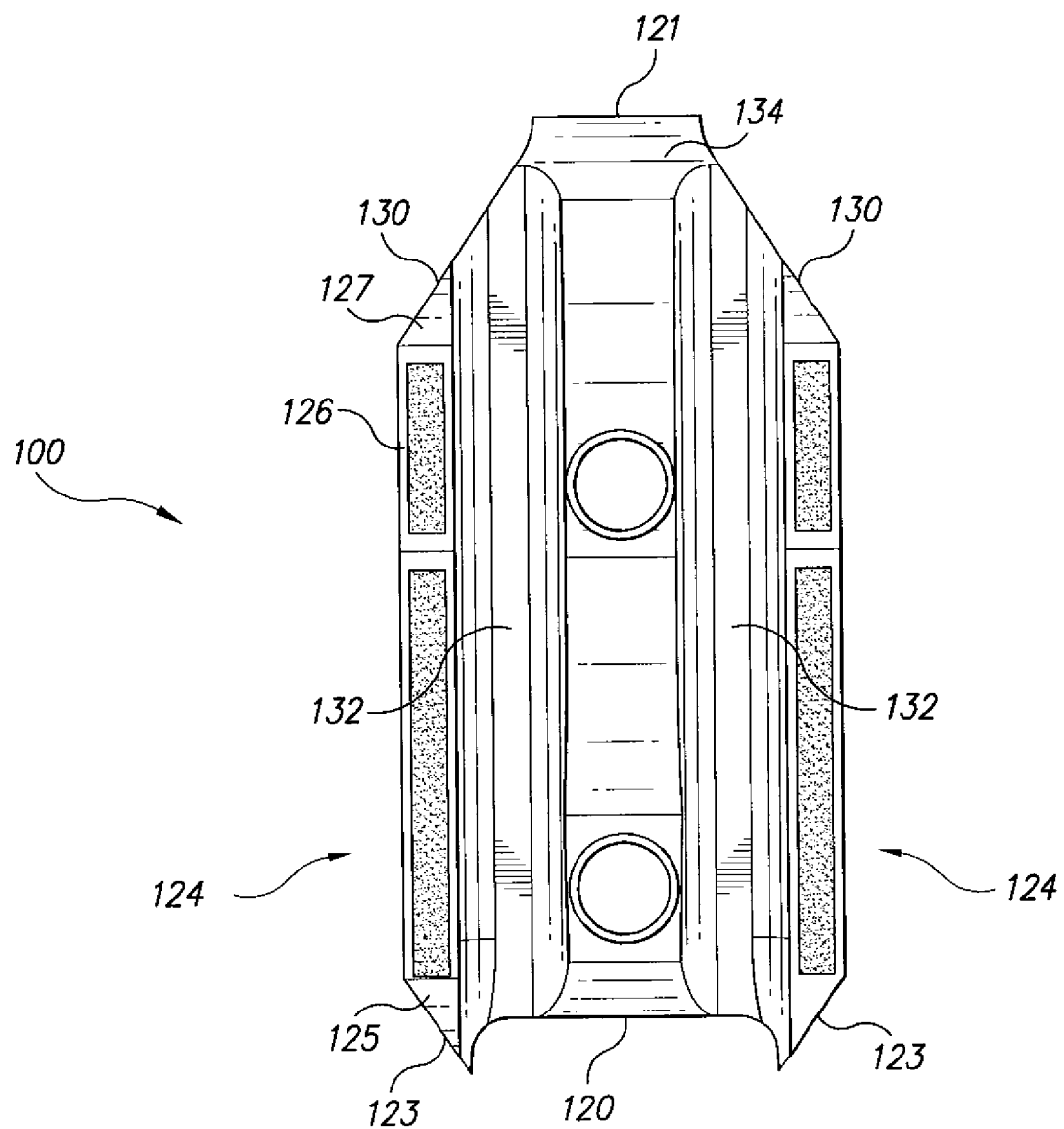
FIG. 5 is a bottom view of the snowmobile ski edge of FIG. 4.
Figure 6:
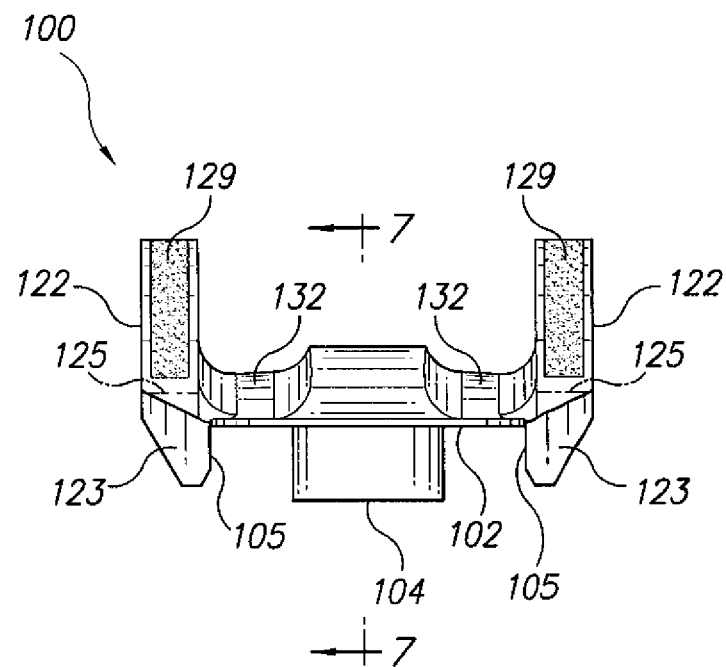
FIG. 6 is a front view of the snowmobile ski edge of FIGS. 4 and 5.
Figure 7:
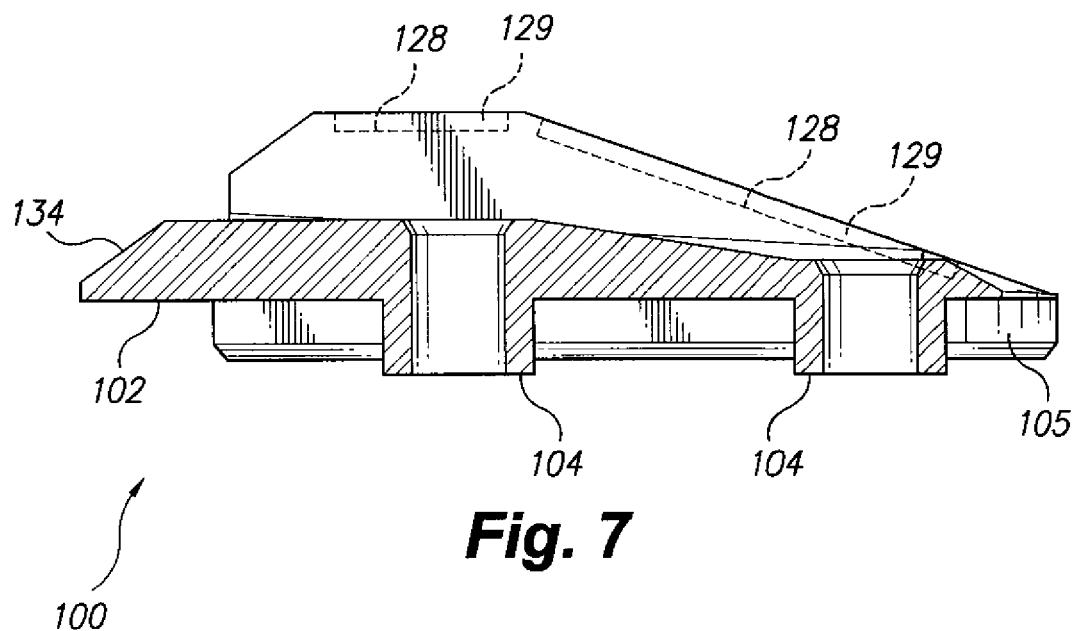
FIG. 7 is a section view taken along lines 7-7 of FIG. 6

As shown in FIGS. 1-3, the snowmobile ski edge 10 includes a polyhedral, main body having a top, mounting face or surface 12, a front 20, a back 21, and an angled bottom face defined by a bottom, declining leading face or surface 29 and a bottom, inclining trailing face 30. The main body is preferably made from a hard ferrous alloy exhibiting durable wear characteristics, but other similar materials are viable alternatives. Since the main function of the snowmobile ski edge 10 is to break up and carve a path through snow and ice in the terrain, the size of the snowmobile ski edge 10 is relatively small, e.g., about 1.50 in. wide, 3.25 in. long and 1.00 in. thick, these dimensions referring to the overall or outermost block dimensions and not to the specifics of the features thereon. The mounting face 12 includes a plurality of bosses 14 disposed along the length of the snowmobile ski edge 10. The bosses 14 define mounting holes through which mounting bolts or studs 16 may be secured, e.g., via welding or threaded. The mounting bolts 16 are adapted to be inserted through mounting holes M in the runner channel R of the snowmobile ski S and secured thereto. Of course other types of fastening means may be used to securely mount the snowmobile ski edge 10, e.g. threaded or spring loaded clamps. Snowmobile skis S typically have a row of mounting holes M in the keel along the runner channel R where runners may be mounted. As mentioned previously, the snowmobile ski edge 10 should be mounted in front of the typical runner. The interior sidewalls 15 together with the mounting face 12 define a channel permitting passage of broken up snow and ice.

The bottom side or face of the snowmobile ski edge 10 includes a plurality of spaced, breaker rails 24 protruding from the bottom, declining surface 29. Although the drawings show a plurality of breaker rails 24, the snowmobile ski edge 10 will work, to some extent, with a single breaker rail 24, preferably attached to one side of the bottom surface 29. The breaker rails 24 each include an angled leading or breaking edge or face 25 and an angled trailing edge or face 26 congruent with the leading face 25. The breaker rails 24 are adapted to plough into the snow and ice in front of the skis S such that the breaking faces 25 break the material to ease traversal of that terrain. Since the breaker rails 24 experience much impact forces, both the breaking and trailing faces 25, 26 include carbide grooves 27 where carbide strips or inserts 28 are brazed, welded, sintered or fixedly deposited therein to increase durability and wear of the breaker rails 24. The carbide strips 28 are preferably made from tungsten carbide. Of course other similar hard and wear resistant materials may be used in place thereof. To ease some of the impact forces transmitted to the handlebars from the breaker rails 24, a shock absorber 40 may be adjustably attached to the mounting posts 16.

Increasing or decreasing the angular disposition of the leading face 25 may adjust the extent of aggressive breaking of the snow and ice. For example and with reference to FIG. 2, increasing the angular disposition of the breaking face 25 to where it approaches perpendicular results in more aggressive breaking characteristics. Decreasing the angular disposition to be more acute results in less aggressive breaking characteristics.

In addition to the breaker rails 24, the snowmobile ski edge 10 includes features to minimize drag from the broken snow and ice. The declining leading face 29 together with breaker rails 24 form channels or runnels that sluice away the broken material towards the inclining trailing face 30 which forms a spout directing material towards the runners. Moreover, the sides 22 of the main body include sections 23 tapering towards the back 21, which allows some turbulent flow of material in the rear to further minimizing drag.

Turning to FIGS. 4-7, these drawings disclose an alternative snowmobile ski edge 100 configured with less aggressive breaking characteristics than the snowmobile ski edge 10. One of the potential hazards that snowmobile users must be aware when riding on some trails is the presence of railroad tracks. To traverse these tracks, the rider ideally approaches the railroad tracks at a perpendicular angle in slow speed. However, an inattentive rider having a more aggressive configured snowmobile ski edge 10 approaching at a relatively fast speed may cause the skis to catch on the rails, which may flip the snowmobile or cause damage to the snowmobile and the rider. The alternative snowmobile ski edge 100 helps alleviate some of these concerns.

As shown in FIGS. 4-7, the snowmobile ski edge 100 includes a polyhedral, main body having a top, mounting face or surface 102, a front 120, a back 121, and an angled bottom face. The main body is preferably made from a hard ferrous alloy exhibiting durable wear characteristics, but other similar materials are viable alternatives. Since the main function of the snowmobile ski edge 100 is to break up and carve a path through snow and ice in the terrain, the size of the snowmobile ski edge 10 is relatively small, e.g., about 1.5 in. wide, 3.25 in. long, and 1.00 in. thick, these dimensions referring to the overall or outermost block dimensions and not to the specifics of the features thereon. The mounting face 102 includes a plurality of bosses 104 disposed along the length of the snowmobile ski edge 100. The bosses 104 define mounting holes through which mounting bolts or studs may be secured. The snowmobile ski edge 100 is adapted to be mounted the skis S in a similar manner as the snowmobile ski edge 10. The interior sidewalls 105 together with the mounting face 102 define a channel permitting passage of broken up snow and ice.

The bottom side or face of the snowmobile ski edge 100 includes a pair of spaced, breaker rails 124 protruding from lateral sides 122 of the main body. The breaker rails 124 each include an angled leading or breaking edge or face 125, an intermediate edge face 126, and an angled trailing edge or face 127 continuous with the intermediate face 126. Since the breaker face 125 is disposed at a more acute angle or rake, the breaking characteristics are not as aggressive as the aforementioned snowmobile ski edge 10. To compensate, the snowmobile ski edge 100 includes tapering sections 123 extending from the sides 122 to form a cutting edge 136, which serve as additional means for breaking snow and ice. Since the breaker rails 124 experience much impact forces, both the breaking and intermediate faces 125, 126 include carbide grooves 128 where carbide strips or inserts 129 are brazed, welded, sintered or fixedly deposited therein to increase durability and wear of the breaker rails 124. The carbide strips 129 are preferably made from tungsten carbide. Of course other similar hard and wear resistant materials may be used in place thereof. As with the snowmobile ski edge 10, the snowmobile ski edge 100 may include a shock absorber 40 adjustably attached to the mounting posts to ease some of the impact forces transmitted to the handlebars from the breaker rails 124.

In addition to the breaker rails 124, the snowmobile ski edge 100 includes features to minimize drag from the broken snow and ice. The bottom face includes a pair of arcuate channels 132 which together with breaker rails 124 form a main channel that sluice away the broken material towards the inclining trailing face 134 which forms a spout directing material towards the runners. Moreover, the sides 122 of the main body include sections 130 tapering towards the back 121, which allows some turbulent flow of material in the rear to further minimizing drag.

It is noted that the snowmobile ski edge 10, 100 encompasses a variety of alternatives. For example, the overall dimensions of the snowmobile ski edge 10, 100 may vary to fit in or on the runner channel of various sized snowmobile skis S. However, the size of the snowmobile ski edge 10, 100 remains proportionally small.

It is to be understood that the present invention is not limited to the embodiments described above, but encompasses any and all embodiments within the scope of the following claims.

I claim:

1. A snowmobile ski edge, comprising:
   a main body having a mounting face, an angled bottom opposite the mounting face, a front end, a back end, and opposing sides;
   a pair of opposed interior sidewalls extending upwardly from lateral sides of the mounting face, wherein the interior sidewalls and the mounting face define a channel for passage of broken snow and ice;
   at least one mounting boss disposed on the mounting face, the boss defining a mounting hole;
   at least one mounting bolt mounted to the at least one mounting boss in order to attach the main body to holes in a runner of a snowmobile ski, the main body being adapted for attachment to a front portion of the snowmobile ski; and
   at least one breaker rail protruding from the angled bottom, the breaker rail having a leading, raked breaking face and a raked trailing face, the breaking and trailing faces each having a carbide groove and a carbide strip disposed in the carbide groove;

wherein the breaker face breaks up snow and ice in front of the snowmobile ski to form a new path of travel and thereby minimize darting.

2. The snowmobile ski edge according to claim 1, wherein said carbide strip is fixed to said carbide groove.

3. The snowmobile ski edge according to claim 1, wherein said trailing face includes a trailing end angled upwardly towards said back end.

4. The snowmobile ski edge according to claim 1, further comprising a shock absorber attached to said at least one mounting post in order to absorb impact forces on said at least one breaker rail.

5. The snowmobile ski edge according to claim 1, wherein the opposing sides of said main body include tapering side sections extending toward the back end to reduce drag.

6. The snowmobile ski edge according to claim 5, further comprising an angled trailing face contiguous with said angled bottom, the angled trailing face extending towards the back end at an angle opposite from said angled bottom, the angled trailing face forming a spout to sluice away broken snow and ice.

7. The snowmobile ski edge according to claim 6, wherein said at least one breaker rail comprises a plurality of spaced apart breaker rails, spacing between adjacent breaker rails forming a channel directing the broken snow and ice towards said spout.

8. The snowmobile ski edge according to claim 7, further comprising a pair of arcuate channels formed along said bottom face for directing broken snow and ice, each of the arcuate channels being interiorly adjacent an outer one of said breaker rails.

9. The snowmobile ski edge according to claim 8, wherein the opposing sides of said main body include tapering sections extending towards the front end, the tapering sections forming a cutting edge to assist breaking snow and ice.

10. The snowmobile ski edge according to claim 1, wherein said carbide inserts are made from tungsten carbide.

11. The snowmobile ski edge according to claim 1, wherein said main body is about 1.50 in. wide, 3.25 in. long and 1.00 in. thick in outermost dimensions.

12. A snowmobile ski edge, comprising:

a main body having a mounting face, a bottom opposite the mounting face, a front end, a back end, and opposing sides, the bottom having angled surfaces for directing broken snow and ice towards the back end, the bottom further comprises a central ridge, the angled surfaces being formed by the central ridge, one of the angled surfaces being a leading face extending towards the front end and another of the angled surfaces being a trailing face extending towards the back end, both the leading and trailing faces being disposed at opposite angles, the leading face directing broken snow and ice towards the back end, and the trailing face forming a spout to sluice away the broken snow and ice;

at least one mounting boss disposed on the mounting face, the boss defining a mounting hole;

at least one mounting bolt mounted to the at least one boss in order to attach the main body to holes in a runner of a snowmobile ski, the main body being adapted for attachment to a front portion of the snowmobile ski; and a pair of spaced apart breaker rails protruding from the bottom, each of the breaker rails having a leading, raked breaking face, an intermediate edge face continuous with the breaking face, and a trailing face sloping upward and away from the intermediate edge face towards the back end, the breaking and intermediate edge faces each having a carbide groove and a carbide strip disposed in the carbide groove;

wherein the breaker face breaks up snow and ice in front of the snowmobile ski to form a new path of travel and thereby minimize darting.

13. The snowmobile ski edge according to claim 12, further comprising a shock absorber attached to said at least one mounting post in order to absorb impact forces on said breaker rails.

14. The snowmobile ski edge according to claim 12, wherein the opposing sides of said main body include tapering side sections extending toward the back end to reduce drag.

15. The snowmobile ski edge according to claim 12, further comprising a pair of arcuate channels formed along the bottom face for directing the broken snow and ice, each of the arcuate channels being interiorly adjacent an outer one of said breaker rails.

16. The snowmobile ski edge according to claim 15, wherein said opposing sides include tapering sections extending towards the front end, the tapering sections forming a cutting edge to assist breaking snow and ice.

17. The snowmobile ski edge according to claim 12, wherein said carbide inserts are made from tungsten carbide.

18. The snowmobile ski edge according to claim 12, wherein said main body is about 1.50 in. wide, 3.25 in. long and 1.00 in. thick in outermost dimensions.

\* \* \* \* \*